US008391788B1

(12) United States Patent  
Mazuk et al.

(10) Patent No.: US 8,391,788 B1
(45) Date of Patent: Mar. 5, 2013

(54) REMOTE CONCENTRATION SYSTEM FOR AN INTEGRATED MODULAR AVIONICS SYSTEM

(75) Inventors: Daniel E. Mazuk, Marion, IA (US); Clifford R. Klein, Marion, IA (US); Daniel J. Goiffon, Cedar Rapids, IA (US); Neal J. Bohnenkamp, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1033 days.

(21) Appl. No.: 12/378,952

(22) Filed: Feb. 20, 2009

(51) Int. Cl.
*H04B 7/00* (2006.01)
(52) U.S. Cl. ........................ 455/41.2; 455/428
(58) Field of Classification Search ............... 455/41.2, 455/575.9, 101
See application file for complete search history.

(56) References Cited

U.S. PATENT DOCUMENTS

| 7,130,724 | B2 | 10/2006 | Petersen |
| 7,421,526 | B2 | 9/2008 | Fletcher |
| 2006/0234787 | A1 | 10/2006 | Lee |
| 2008/0140267 | A1* | 6/2008 | Matuska et al. ........... 701/3 |
| 2008/0217471 | A1 | 9/2008 | Liu |
| 2008/0282817 | A1* | 11/2008 | Breed ........................ 73/865.9 |
| 2009/0322516 | A1* | 12/2009 | Coffland et al. ......... 340/539.13 |

* cited by examiner

*Primary Examiner* — Tu X Nguyen
(74) *Attorney, Agent, or Firm* — Donna P. Suchy; Daniel M. Barbieri

(57) ABSTRACT

A remote concentration system includes at least one avionics computing resource module; and, a plurality of remote wireless data concentration components. The avionics computing resource module and the wireless data concentration components are operably connected via a wireless (Ultra-Wideband) UWB network. The wireless data concentration components may be operably connected with multiple data paths via the wireless UWB network to enhance communication availability.

13 Claims, 4 Drawing Sheets

REMOTE CONCENTRATION SYSTEM FOR AN INTEGRATED MODULAR AVIONICS SYSTEM

BACKGROUND OF THE INVENTION

1. Field of the Invention

The present invention relates generally to avionics systems and more particularly to an improved wireless architecture for interconnecting data concentration components.

2. Description of the Related Art

Modern onboard avionics networks serve to provide data transfer between various components of an aircraft. Avionics systems typically have a variety of systems that provide data to processing components of the aircraft or exchange data among one or more components of the aircraft. For example, a variety of avionics modules may gather avionics data (e.g., sensors detecting speed, direction, external temperature, control surface positions, and the like) that is routed by the avionics system via an avionics network to one or more aircraft components such as displays, monitoring circuits, processors, and the like.

In some aircraft systems, the avionics network may be constructed with an Aeronautical Radio INC. (ARINC) 429 data bus capable of supporting communication between many components. More recently, Ethernet networks have been used in avionic network environments by leveraging Commercial Off The Shelf (COTS) technology to increase bandwidth and reduce cost.

Ethernet type networks have been used in communication networks for implementing communication among various network components. An Ethernet network may be used to send or route data in a digital form by packets or frames. Each packet contains a set of data, and the packet is generally not interpreted while sent through the Ethernet network. In an avionics network environment, the Ethernet network typically has different components that subscribe to the avionics network and connect to each other through switches. Each network subscriber can send packets in digital form, at controlled rates, to one or more other subscribers. When a switch receives the packets, the switch determines the destination equipment and directs or switches the packets to such equipment.

Such Ethernet networks may include ARINC-664 based networks. In a switched full-duplex Ethernet type network, the term "full-duplex" refers to sending and receiving packets at the same time on the same link, and the term "switched" refers to the packets being switched in switches on appropriate outputs. However, the ARINC-664 network uses multiple switches and redundant paths to route data, point-to-point or point-to-multipoint across the switches. Typically, remote data concentrators are connected using a wired ARINC-664 network.

Current Integrated Modular Avionics (IMA) architectures are reliant on data concentrators to bring the aircraft system I/O into the IMA system. The data concentrators are located remotely within the aircraft to reduce the wire weight of the system. Typically they are connected by the IMA backbone bus. Some of the locations of the remote data concentrators (RDC's) are a very hostile environment or the backbone bus wire needs to travel through the hostile environment to get to the RDC.

These difficult installations could benefit from a wireless link to/from the IMA backbone bus.

There are patents that have issued that have involved details of the reconfiguration of the data on a bus, but not the bus structure or path. For example, U.S. Pat. No. 7,421,526, issued to Fletcher et al, entitled "Reconfigurable Virtual Backplane Architecture" discloses a communication network that comprises a communication bus and at least two line cards. Each of the line cards are coupled to the communication bus. The line cards comprise a processor and a configuration memory coupled to the processor. The communication occurring on the communication bus is predetermined, but can be reconfigured during real time operation by events or by the addition or subtraction of line cards. The configuration memory comprises an array of configuration tables, each configuration table storing a listing of processes to run and data to be transmitted or received by the process. A current configuration table is selected from the array of configuration tables upon the occurrence of a predefined event.

U.S. Publication No. 20080217471, entitled "Intelligent Aircraft Secondary Power Distribution System That Facilitates Condition Based Maintenance" discloses an electrical power distribution system that comprises a solid state power controller in communication with an aircraft system main data bus via a gateway module and a condition based maintenance module in communication with the solid state power controller via a communication network distinct from the main data bus. A method of load/feeder health assessment for an electrical power distribution system includes applying a controlled excitation to a load; sampling information from the load/feeder system for the load; characterizing a normal behavior of the load/feeder system for the load; determining if the load characteristics are within the normal behavior profile for the load; and shutting down power to the load if load characteristics are not within the profile when immediate action is indicated or generating a health message for the load when immediate action is not required. The '471 publication does not discuss a network.

SUMMARY OF THE INVENTION

In a broad aspect, the present invention is a remote concentration system for an avionics system. The remote concentration system includes at least one avionics computing resource module; and, a plurality of remote wireless data concentration components. The avionics computing resource module and the wireless data concentration components are operably connected via a wireless (Ultra-Wideband) UWB network. The wireless data concentration components may be operably connected with multiple data paths via the wireless UWB network to enhance communication availability.

In a purely wireless configuration, the avionics computing resource module includes a plurality of avionics computing resource elements; and, a UWB transceiver for providing wireless UWB communication with said plurality of avionics computing resource elements.

In a mixed wired/wireless configuration, the avionics computing resource module includes a plurality of avionics computing resource elements. At least one gateway module is operably connected to the avionics computing resource elements for providing wired communication of the plurality of avionics computing resource elements to at least one wired data concentration component. A UWB transceiver provides wireless UWB communication with the plurality of remote wireless data concentration components.

The present invention is particularly advantageous in an avionics application because it provides for a very significant reduction in the aircraft wire weight. It can be used in hostile environments within the aircraft, e.g. the rotor burst zone. It does not affect the safety signal routing analysis, thus providing a very robust system, immune to certain effects that would render conventional wired or wireless systems inoperative.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
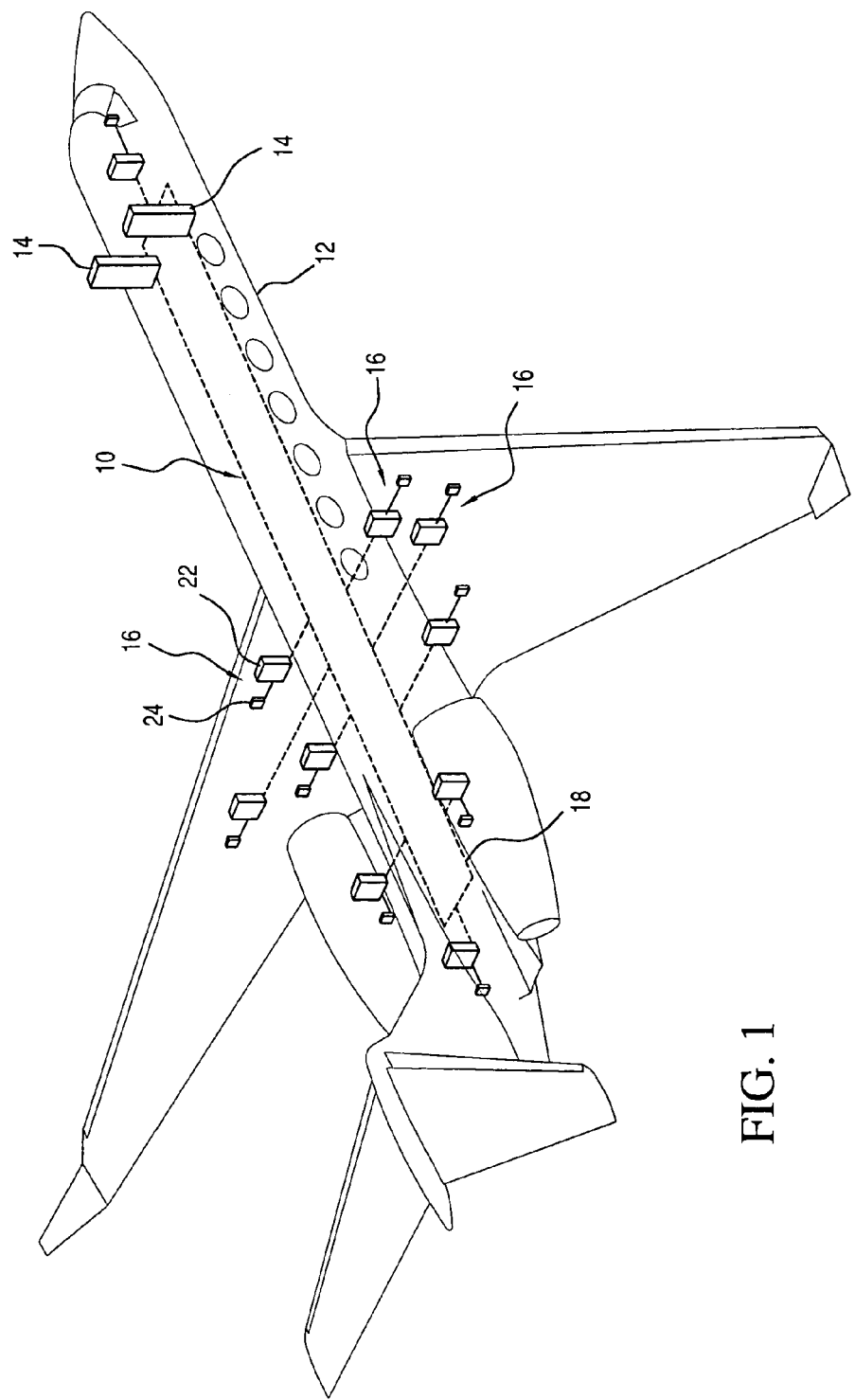
FIG. 1 illustrates an aircraft employing the remote concentration system of the present invention.

Referring now to the drawings and the characters of reference marked thereon, FIG. 1 illustrates a remote concentration system for an avionics system, designated generally as 10, in accordance with the principles of the present invention, as implemented on an airplane 12. The remote concentration system includes a pair of avionics computing resource modules 14; and, a plurality of remote wireless data concentration components, designated generally as 16. The avionics computing resource modules 14 and the plurality of wireless data concentration components 16 are operably connected via a wireless (Ultra-Wideband) UWB network, designated generally as 18.

Figure 2:
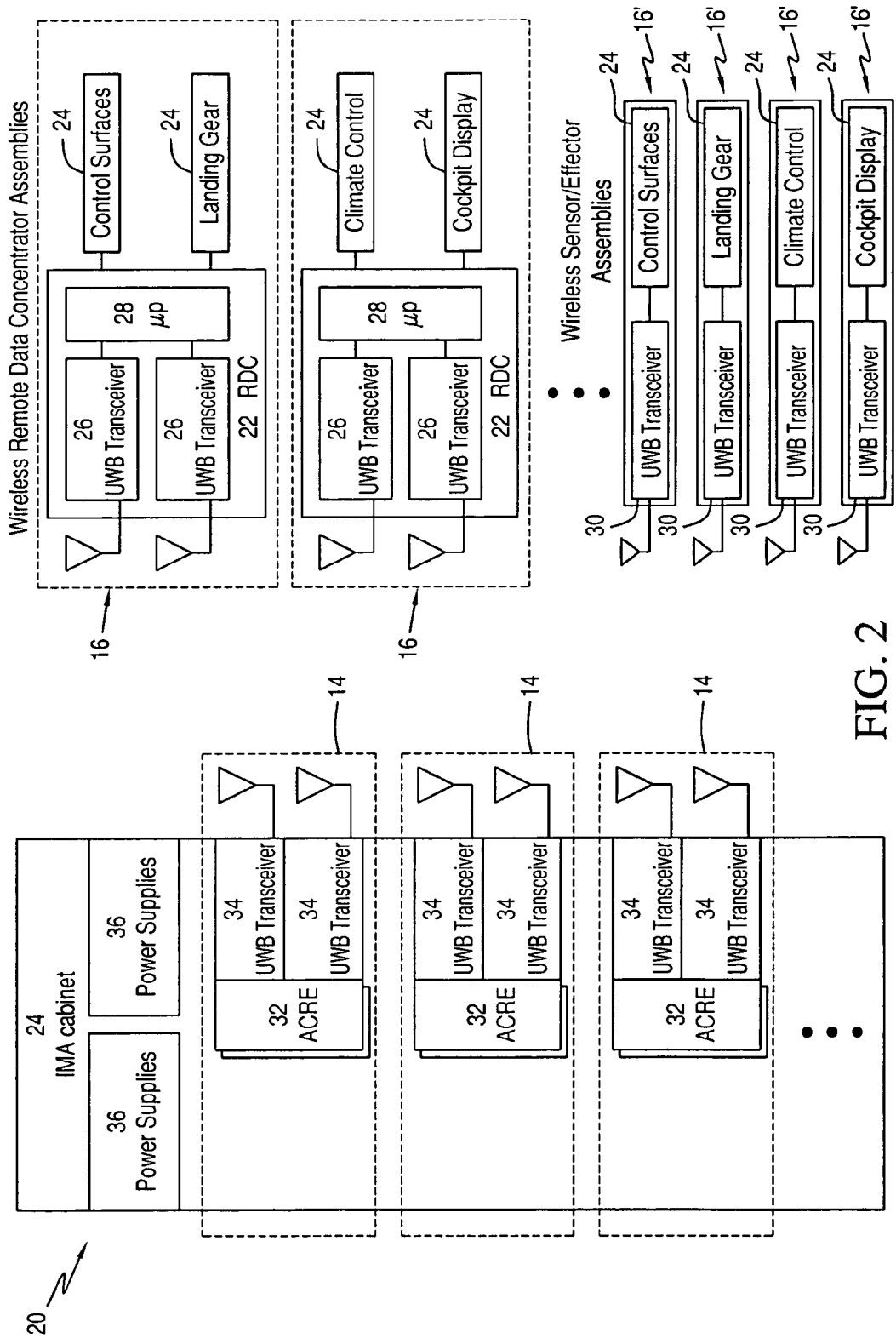
FIG. 2 illustrates a remote concentration system utilizing purely wireless components.

As can be seen by reference to FIG. 2, the remote concentration system can be implemented as a purely wireless system, designated generally as 20. In this instance, the remote wireless data concentration components may include wireless remote data concentrator (RDC) assemblies 16; and, wireless sensor/effector assemblies 16'. Each RDC assembly 16 includes an RDC 22 and at least one avionics module 24 operably connected to the RDC 22. The avionics modules 24 may be flight control surface sensors, landing gear sensors, cabin climate control sensors, cockpit display devices, etc. Each RDC 22 includes a UWB transceiver 26 and a microprocessor 28. Each RDC 22 is preferably dual channel to provide the desired redundancy and fail-passive attributes. The RDC's 22 provide access into the system for the sensors and effectors. The manufacture of RDC's is well known to those skilled in this field. As an example, the RDC may utilize a Freescale MPC5567 processor.

Each wireless sensor/effector assembly 16' includes a UWB transceiver 30 connected to an avionics module 24. The UWB transceivers 26,30 may comprise, for example, CoAir™ chipsets manufactured by Sigma Designs.

It should be noted that while the various avionics modules 24 are depicted as discrete distributed components, it will be recognized by one skilled in the art that such functionality (e.g. control functionality, sensor functionality, etc.) may be implemented in any number of forms including but not limited to software, hardware, firmware, application specific integrated circuitry (ASICs) and the like and may be configured as part of distributed or integrated systems without departing from the scope of the present disclosures. For example, the UWB transceiver 30 can be incorporated with the avionics module 24.

The remote concentration system 10 may be implemented as an integrated modular avionics (IMA) system comprising an IMA cabinet 24 containing the avionics computing resource modules 14 also referred to herein as line-replaceable unit (LRU) processing modules. An LRU 14 may be a removable system component designed to be replaced quickly at an airport ramp area. Such an LRU 14 may be designed to common specifications so as to be interchangeable within multiple sockets within an avionics system as well as cross-compatible between multiple aircraft.

In the wireless configuration shown in FIG. 2, each LRU 14 includes a plurality of avionics computing resource elements (ACRE's) 32 operably connected to a UWB transceiver 34. Each ACRE (or processing unit) 32 may be, for example, a fail-passive processor, as discussed below in detail. The IMA cabinet 24 includes appropriate power supplies 36.

Figure 3:
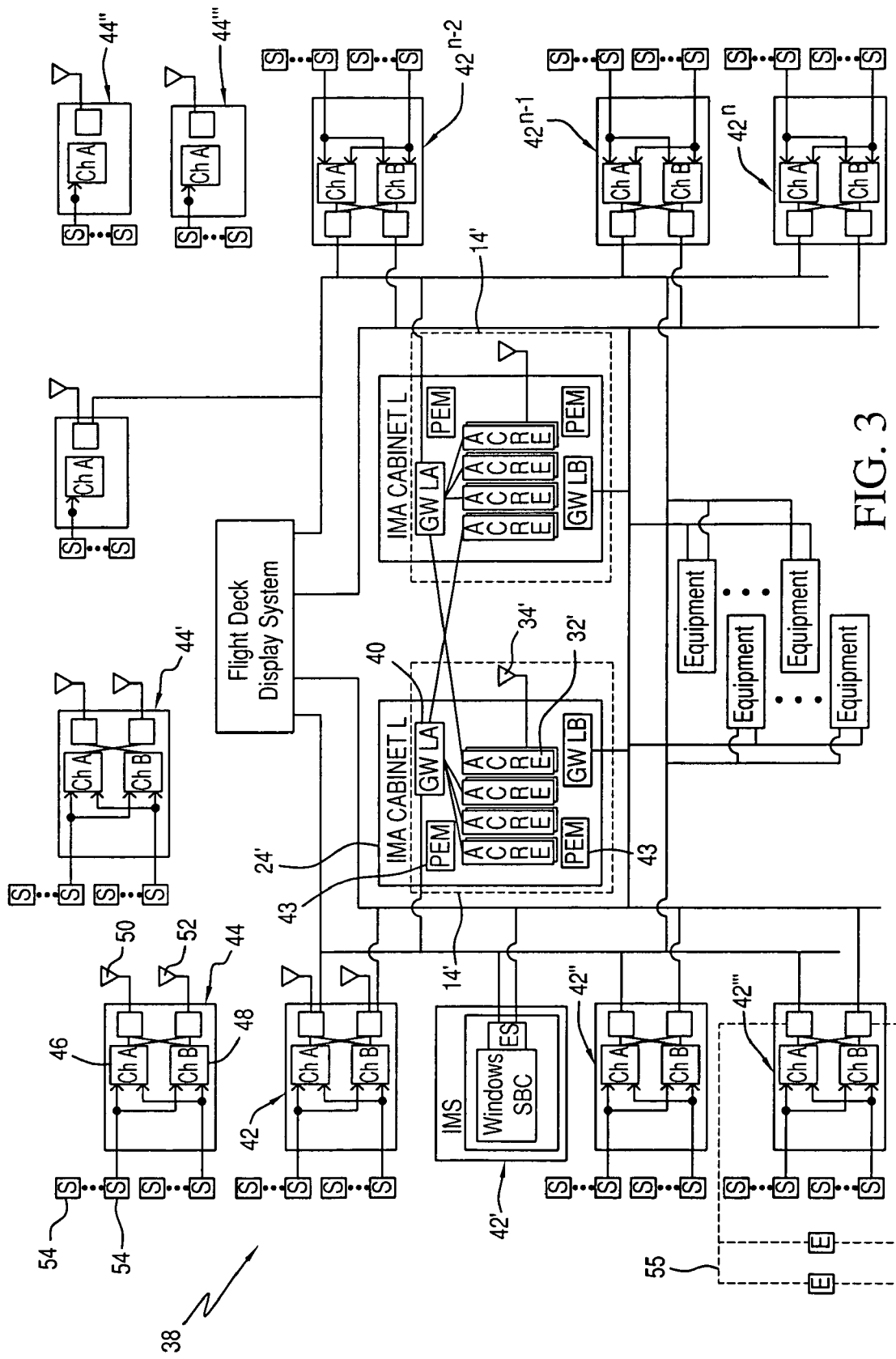
FIG. 3 illustrates a remote concentration system implemented in an integrated modular avionics (IMA) system.

Referring now to FIG. 3, implementation of the present system in a mixed wireless/wired IMA system is illustrated, designated generally as 38. In this system 38, each of two avionics computing resource modules (or LRU's) 14' are positioned within a respective IMA cabinet 24'. Each LRU 14 includes a plurality of avionics computing resource elements (ACRE's) 32'. Two gateway modules 40 are operably connected to the avionics computing resource elements 32' for providing wired communication of the avionics computing resource elements 32' to specified wired data concentration components 42, 42', 42", . . . 42'". Each computing resource module 14' has appropriate power environmental modules (i.e. power supplies) 43.

Each avionics computing resource module 14' includes a UWB transceiver 34' for providing wireless UWB communication with specified wireless data concentration components 44, 44', 44", . . . 44'".

The wired and wireless data concentration components 42, 44 preferably have dual channels 46, 48 for redundancy. Each channel 46, 48 is connected to a respective UWB transceiver 50, 52. Input is provided by sensors 54. This wireless network provides multiple redundant paths. Its flexibility and scalability can provide work around for failures in the system. The data concentration components may be daisy chained so that if one path fails then there are other suitable paths. As shown, for example, in FIG. 3, there are eleven wireless transceivers and therefore, at a minimum, eleven redundant paths for data to flow through the network. This greatly improves the data availability in the system, improving the overall safety of the system. Thus, a primary benefit of the present invention is that there may be multiple failures in the system but no loss of functionality.

Each wired data concentration component 42 may include a fiber access network 55 including appropriate inputs including, for example, discrete signal conditioning, CAN bus, Flex Ray bus, and ARINC 429 bus.

Figure 4:
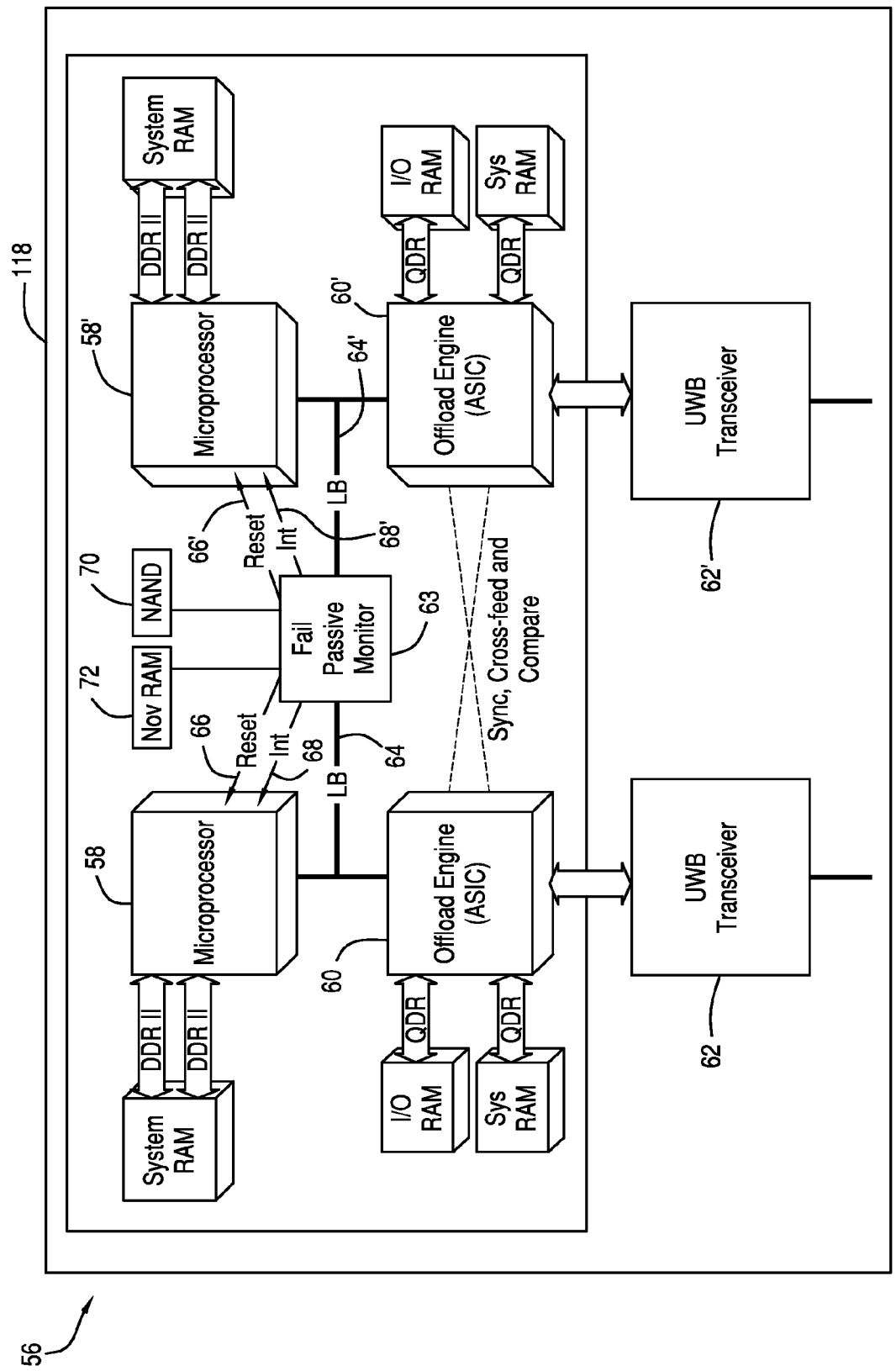
FIG. 4 is a schematic illustration of an avionics computing resource module of the remote concentration system.

Referring now to FIG. 4 a low-level illustration of an example fail-passive computing resource module (i.e. LRU), designated generally as 56, is shown. A processing unit 58 of an avionics computing resource element of the fail-passive computing resource module 56 includes an offload engine 60 which is operably coupled to a UWB transceiver 62. The offload engine 62 may be an application specific integrated circuit (ASIC) tasked with routing outgoing data from the processor 58 (e.g. a processor such as model MPC5567 manufactured by Freescale Semiconductor) to the UWB transceiver 62 for transmission to remote wireless data concentration components 44 distributed about the aircraft. Similarly, a second offload engine 60' may be tasked with routing incoming data (e.g. data originating from a sibling processing unit 58') between a UWB transceiver 62' and the processor 58'. In this fail-passive processing example, the offload engine 60 and offload engine 60' may each include two internal components. Each engine 60, 60' may provide interface capability with a respective UWB transceiver 62 and UWB transceiver 62'. The other component may synchronize, cross-feed, and cross-compare the data such that both processing units 58, 58' are provided with correct and consistent data. For other applications where fail-passive processing is not needed, a single processing unit 58 and offload engine 60 may be employed, where the offload engine 60 provides the interface to the UWB transceiver 62.

For the fail-passive example shown, a fail-passive monitor 63 may provide a cross-comparison function between local buses (LB) 64, 64' associated with each processing unit 58, 58'. The fail-passive monitor 62 may detect differences in data provided to each processing unit 58, 58' which may indicate a failure, thereby ensuring the integrity of data. This fail-passive monitor 62 may further provide functions which aid in the synchronization of the processors, allowing them to produce identical results on identical data for a fault-free case. Synchronized resets 66, 66' and synchronized interrupts 68, 68' may be provided to both processors to maintain synchronization for switching among multiple processes. As an implementation convenience, the fail-passive monitor 62 may provide interfaces with memory devices that are not required to be dual for fail-passivity (e.g. a NAND program memory 70; and, non-volatile data memory 72). For such cases, other means such as CRCs may be used to ensure the necessary data integrity rather than use of a dual configuration.

Heretofore, wireless systems have not been utilized with aircraft avionics systems. Wireless systems have not been considered because they have not met requisite requirements of very high integrity, high bandwidth, immunity to interference, high security, proper range requirements, ability not to create interference, etc., required for these applications. UWB differs substantially from conventional narrowband radio frequency (RF) and spread spectrum technologies (SS), such as Bluetooth Technology and 802.11a/b/g. UWB uses an extremely wide band of RF spectrum to transmit data. In so doing, UWB is able to transmit more data in a given period of time than the more traditional technologies. This is necessary in an avionics related environment.

UWB is a unique and new usage of a recently legalized frequency spectrum. UWB radios can use frequencies from 3.1 GHz to 10.6 GHz—a band more than 7 GHz wide. Each radio channel can have a bandwidth of more than 500 MHz, depending on its center frequency. To allow for such a large signal bandwidth, the FCC put in place severe broadcast power restrictions. By doing so, UWB devices can make use of an extremely wide frequency band while not emitting enough energy to be noticed by narrower band devices nearby, such as 802.11a/b/g radios. This sharing of spectrum allows devices to obtain very high data throughput which is necessary in such IMA backbone networks. These networks are fixed and in relatively close proximity and enable the use of UWB technology.

Additionally, UWB's low power requirements make these systems cost-effective. With the characteristics of low power, low cost, and very high data rates at limited range, UWB is highly effective for this high-speed avionics system.

UWB technology also allows spectrum reuse. A cluster of devices in proximity can communicate on the same channel as another cluster of devices in another portion of the aircraft. UWB-based RDC's have such a short range that nearby clusters can use the same channel without causing interference. An 802.11g WLAN solution, however, would quickly use up the available data bandwidth in a single device cluster, and that radio channel would be unavailable for reuse anywhere else in the home.

Other embodiments and configurations may be devised without departing from the spirit of the invention and the scope of the appended claims.

The invention claimed is:

1. A remote concentration system for an avionics system, comprising:
   a) at least one avionics computing resource module; and,
   b) a plurality of remote wireless data concentration components, said avionics computing resource module and said plurality of wireless data concentration components being operably connected via a wireless (Ultra-Wideband) UWB network, wherein each of said least one avionics computing resource modules, comprises:
      1) a plurality of avionics computer resource elements, each avionics computer resource element, comprising:
         a processing unit; and,
         an offload engine connected to said processing unit for routing outgoing data from said processing unit; and,
      2) a plurality of UWB transceivers, each operably connected to an associated avionics computer resource element for providing wireless UWB communication with said plurality of avionics computing resource elements,
   wherein said processing units of said plurality of avionics computer resource elements are set up as fail-passive.

2. The remote concentration system of claim 1, wherein said wireless data concentration components are operably connected with multiple data paths via said wireless UWB network to enhance communication availability.

3. The remote concentration system of claim 1, wherein each of said offload engines comprises an application specific integrated circuit (ASIC).

4. The remote concentration system of claim 1, wherein said plurality of remote wireless data concentration components comprises a plurality of remote data concentrator (RDC) assemblies.

5. The remote concentration system of claim 1, wherein said plurality of remote wireless data concentration components comprises a plurality of remote wireless data concentrator (RDC) assemblies, each RDC assembly comprising:
   a) a remote data concentrator (RDC); and,
   b) an avionics module operably connected to said RDC.

6. The remote concentration system of claim 1, wherein said plurality of remote wireless data concentration components comprises a plurality of remote data concentrator (RDC) assemblies, each RDC assembly comprising:
   a) a remote data concentrator (RDC) comprising a UWB transceiver; and, a microprocessor operably connected to said UWB transceiver; and,
   b) an avionics module operably connected to said RDC.

7. The remote concentration system of claim 1, wherein said plurality of remote wireless data concentration components comprises a plurality of remote data concentrator (RDC) assemblies, each RDC assembly, comprising:
   a) a remote data concentrator (RDC); and,
   b) an avionics module operably connected to said RDC, wherein said avionics module is one of a set of aircraft avionics modules selected from the set consisting of: flight control surface sensors; landing gear sensors; cabin climate control sensors; and, cockpit display devices.

8. The remote concentration system of claim 1, wherein said plurality of remote wireless data concentration components comprises a plurality of remote data concentrator (RDC) assemblies, each RDC assembly comprising:

a) a dual channel remote data concentrator (RDC); and, b) an avionics module operably connected to said RDC.

9. The remote concentration system of claim 1, wherein said plurality of remote wireless data concentration components comprises a plurality of wireless sensor/effector assemblies.

10. The remote concentration system of claim 1, wherein each of said remote wireless data concentration components, comprise a plurality of wireless sensor/effector assemblies, each wireless sensor/effector assembly, comprising:

a) a UWB transceiver; and, b) an avionics module operably connected to said UWB transceiver.

11. The remote concentration system of claim 1, wherein each of said remote wireless data concentration components, comprise a plurality of wireless sensor/effector assemblies, each wireless sensor/effector assembly, comprising:

a) a UWB transceiver; and, b) an avionics module operably connected to said UWB, wherein said avionics module is one of a set of aircraft avionics modules selected from the set consisting of: flight control surface sensors; landing gear sensors; cabin climate control sensors; and, cockpit display devices.

12. A remote concentration system for an Integrated Modular Avionics (IMA) system, comprising:

a) at least one avionics computing resource module, comprising;

a) plurality of avionics computing resource elements b) at least one gateway module operably connected to said avionics computing resource elements for providing wired communication of said plurality of avionics computing resource elements to at least one wired data concentration component; and, c) a resource module (Ultra-Wideband) UWB transceiver for providing wireless UWB communication with a plurality of remote wireless data concentration components; and, b) a plurality of remote wireless data concentration components, comprising a plurality of remote wireless data concentrator (RDC) assemblies and a plurality of wireless sensor/effector assemblies, wherein, a) each RDC assembly, comprises:

1. a remote data concentrator (RDC) comprising a UWB transceiver; and, a microprocessor operably connected to said UWB transceiver; and, 2. an avionics module operably connected to said RDC; and, b) each wireless sensor/effector assembly, comprises:

1. a sensor/effector assembly UWB transceiver; and, 2. an avionics module operably connected to said UWB transceiver;

wherein said at least one avionics computing resource module and said plurality of wireless data concentration components are operably connected via a wireless UWB network with multiple data paths to enhance communication availability.

13. A remote concentration system for an avionics system, comprising:

a) at least one avionics computing resource module; and, b) a plurality of remote wireless data concentration components, said avionics computing resource module and said plurality of wireless data concentration components being operably connected via a wireless (Ultra-Wideband) UWB network, wherein said plurality of remote wireless data concentration components comprises a plurality of remote data concentrator (RDC) assemblies, each RDC assembly, comprising:

1) a dual channel remote data concentrator (RDC); and, 2) an avionics module operably connected to said RDC.

\* \* \* \* \*